United States Patent
Savage et al.

(10) Patent No.: US 10,296,491 B2
(45) Date of Patent: May 21, 2019

(54) SYSTEM AND METHOD FOR IP FINGERPRINTING AND IP DNA ANALYSIS

(71) Applicant: Silvaco, Inc., Santa Clara, CA (US)

(72) Inventors: Thomas Warren Savage, San Jose, CA (US); Michael Cizl, Kirchseeon (DE); Jeffrey Allen Roberts, San Jose, CA (US)

(73) Assignee: Silvaco, Inc., Santa Clara, CA (US)

( * ) Notice: Subject to any disclaimer, the term of this patent is extended or adjusted under 35 U.S.C. 154(b) by 364 days.

(21) Appl. No.: 14/880,944

(22) Filed: Oct. 12, 2015

(65) Prior Publication Data
US 2017/0103079 A1    Apr. 13, 2017

(51) Int. Cl.
| | | |
|---|---|---|
| G06F 17/30 | (2006.01) | |
| G06F 16/11 | (2019.01) | |
| G06F 16/14 | (2019.01) | |
| G06F 16/951 | (2019.01) | |
| G06F 16/955 | (2019.01) | |
| G06F 16/958 | (2019.01) | |
| G06Q 30/00 | (2012.01) | |

(Continued)

(52) U.S. Cl.
CPC .......... *G06F 16/116* (2019.01); *G06F 16/148* (2019.01); *G06F 16/156* (2019.01); *G06F 16/951* (2019.01); *G06F 16/955* (2019.01); *G06F 16/972* (2019.01); *G06F 17/30076* (2013.01); *G06F 17/30106* (2013.01); *G06F 17/30112* (2013.01); *G06F 17/30864* (2013.01); *G06F 17/30876* (2013.01); *G06F 17/30893* (2013.01); *G06F 21/16* (2013.01); *G06Q 30/018* (2013.01); *G06Q 50/184* (2013.01)

(58) Field of Classification Search
CPC ......... G06F 17/30076; G06F 17/30106; G06F 17/30112; G06F 17/30864; G06F 17/30867; G06F 17/30893
See application file for complete search history.

(56) References Cited

U.S. PATENT DOCUMENTS

| | | | | |
|---|---|---|---|---|
| 7,804,982 | B2 * | 9/2010 | Howard | G06F 17/30011 |
| | | | | 382/115 |
| 2006/0104224 | A1 * | 5/2006 | Singh | G06F 21/32 |
| | | | | 370/310 |

(Continued)

OTHER PUBLICATIONS

Butakov, S., et al., "The toolbox for local and global plagiarism detection", Computers & Education, Pergamon, Amsterdam, NL, vol. 52, No. 4., May 1, 2009, pp. 781-788.

(Continued)

*Primary Examiner* — Cam Y T Truong (57) ABSTRACT

Embodiments disclosed include computer implemented systems and methods comprising multiple computer programs that when used together as part of the system enable the detection of one set of computer files within another set of files without having direct access to the files themselves. A computer program generated unique fingerprint for each set of files that is a condensed representation of that file that ensures no reverse engineering is possible from its use. Another computer program serves as a public repository to securely store fingerprints from multiple sources (e.g. companies).Additionally, another computer program is used to analyze the two or more file sets and produces a report that shows whether files in one set are contained in the other.

9 Claims, 6 Drawing Sheets

(51) Int. Cl.
  *G06F 21/16* (2013.01)
  *G06Q 50/18* (2012.01)

(56) References Cited

U.S. PATENT DOCUMENTS

| | | | |
|---|---|---|---|
| 2007/0294544 A1* | 12/2007 | Ishikawa | G06F 21/10 713/193 |
| 2010/0036808 A1* | 2/2010 | Lee | G06F 17/30781 707/728 |
| 2012/0173656 A1* | 7/2012 | Sorenson, III | G06F 17/30156 709/217 |
| 2014/0068768 A1* | 3/2014 | Lospinuso | G06F 21/562 726/23 |

OTHER PUBLICATIONS

Elkhidir, Mohamed, et al., "Plagiarism detection using free-text fingerprint analysis", 2015 World Symposium on Computer Networks and Information Security, Sep. 19, 2015, pp. 1-4.

Sorokina, D., et al., " Plagiarism Detection in arXiv", Sixth IEEE International Conference on Data Mining, Hong Kong, CN, Dec. 22, 2006, pp. 1070-1075.

Butakov S et al: "The toolbox for local and global plagiarism detection", Computers & Education, Pergamon, Amsterdam, NL, vol. 52, No. 4, May 1, 2009 (May 1, 2009), pp. 781-788, XP025980588, ISSN: 0360-1315, DOI: 10.1016/J.COMPEDU.2008,12.001 [retrieved on Jan. 9, 2009] p. 3, paragraph 1-paragraph 2; figures 1, 4, 5.

Elkhidir Mohamed et al: "Plagiarism detection using free-text fingerprint analysis", 2015 World Symposium on Computer Networks and Information Security (WSCNIS), IEEE, Sep. 19, 2015 (Sep. 19, 2015), pp. 1-4. XP032839068, DOI: 10.1109/WSCNIS.2015.7368306 ISBN: 978-1-4799-9906-4 [retrieved on Dec. 29, 2015] p. 2-p. 3: figures 2, 3, 5.

Daria Sorokina et al: "Plagiarism Detection in arXiv", Proceedings/ Sixth IEEE International Conference on Data Mining, ICDM 2006; Hong Kong, China; Dec. 18-22, 2006, IEEE Computer Society, Piscataway, NJ, USA, Dec. 1, 2006 (Dec. 1, 2006), pp. 1070-1075, XP031003136, ISBN: 978-0-7695-2701-7 p. 2.

* cited by examiner

SYSTEM AND METHOD FOR IP FINGERPRINTING AND IP DNA ANALYSIS

CROSS REFERENCE TO RELATED APPLICATIONS

NA

BACKGROUND

Intellectual property is increasingly licensed between companies as part of the globalization of the world economy. This intellectual property (IP) is most often embodied in computer files and exchanged electronically between companies. In certain technology areas, such as semiconductors, there is an explosion of licensing between a burgeoning number of $3^{rd}$-party IP companies and semiconductor companies who incorporate that IP into their products. The systems and methods for managing and tracking the large amount of semiconductor IP being used today is largely ad hoc and relies on manual processes to insure compliance. As a result, corporations are exposed to significant risk and liability through either intentional or accidental use of the technology as the legal and finance operations of the companies who are familiar with the licensing aspects of the technology are not connected to the actual use of the technology by the engineering operations of the company.

As a specific example, a company may have acquired the legal rights to a piece of IP for (re)use in one specific application, but the engineering operations may not be aware of which rights were secured and may have used the IP in additional applications for which rights were not secured. As a result, the company may be liable to litigation by the IP owner as well as injunction against selling the products that contained that IP.

Another problem in the industry is that with the advent of outsourcing, there are a number of contract workers that have access to the source code of designs and may introduce "back doors", "Trojan horses", or other malware to $3^{rd}$-party IP that is difficult for the company to detect.

As a specific example within the semiconductor industry, such malicious modifications would be buried deep in the semiconductor device. An "infected" device could be placed into production (aircraft, satellite, consumer device) and not detected until the malware was activated, possibly many years after the malware was introduced to the device. Since the malware exists in hardware, it is not possible to remove the malware through a software update and instead would require a complete recall of all infected products. Tracking the whereabouts of infected products may be impossible due to the many levels of the semiconductor supply chain.

Increasing and massive IP reuse brings with it, its own set of challenges. Further, with a large number of suppliers and an even larger number of IP titles in the marketplace, every contract drafted is different, and there is no benchmark or industry standard. With contract terms, use rights and restrictions being varied, access is largely uncontrolled. This leads to both accidental and deliberate reuse. Further, today's IP reuse is "manually" tracked, mostly through spreadsheets, so updating becomes extremely laborious, error prone, and inefficient. This also results in dangerous exposure on legal liability. While there have been attempts in the market to solve this problem, only partial solutions have been provided by electronic design automation (EDA) and design management (DM) companies resulting in significant gaps. Embodiments of the disclosed invention, recited methods and systems to fingerprint IP substantially fill these gaps and improve the efficacy of those partial solutions.

There remains a need for "Fingerprinting" IP, i.e. a tool that can scan IP and chip databases resulting in generation of a unique "fingerprint" for both IP and chips.

There remains a further need for an IP Repository of fingerprinted IP, i.e. a public place for a reference library of IP fingerprints from IP companies.

There remains yet another need for "DNA" Analysis of IP, i.e. a tool to analyze chip fingerprints comparing them to a reference library of IP fingerprints to produce a report on which IP is contained in the chip.

SUMMARY

A system of one or more computers can be configured to perform particular operations or actions by virtue of having software, firmware, hardware, or a combination installed on the system that in operation causes or cause the system to perform the actions. One or more computer programs can be configured to perform particular operations or actions by virtue of including instructions that, when executed by data processing apparatus, cause the apparatus to perform the actions. An embodiment includes causing the computer system to generate a mathematical representation of a first file or group of files in a condensed format that uniquely identifies the file or group of files while making it impossible to reverse engineer their original content. The computer system is further caused to store the mathematical representation in the condensed format, in a repository. A second file or group of files is then analyzed, and the computer system is caused to determine, based on the analysis, and with reference to the repository, if the analyzed second file or group of files contain an element or elements included in the first file or group of files. Based on the analysis with reference to the repository, a report is generated, which includes zero or more of the elements contained in the repository as being present in the analyzed second file or group of files. According to an embodiment, the analysis is augmented by a user generated element or elements stored in another repository. Other embodiments of this aspect include corresponding computer systems, apparatus, and computer programs recorded on one or more computer storage devices, each configured to perform the actions of the methods.

An embodiment includes, in a computer automated system comprising a processing unit, a non-transitory storage medium coupled to the processing unit, and having instructions encoded thereon, a method comprising, generating a mathematical representation of a first file or group of files in a condensed format that uniquely identifies the file or group of files while making it impossible to reverse engineer their original content. The method further comprises storing the mathematical representation in the condensed format, in a repository. Further the method comprises analyzing a second file or group of files, and based on the analysis, determining, with reference to the repository, if the analyzed second file or group of files contain an element or elements included in the first file or group of files. Based on the determining by referencing the repository, the method comprises generating a report including zero or more of the elements contained in the analyzed second file or group of files. According to an embodiment, the analyzing is augmented by a user generated element or elements stored in another repository. Other embodiments of this aspect include corresponding computer systems, apparatus, and computer programs recorded on one or more computer storage devices, each configured to perform the actions of the methods.

DETAILED DESCRIPTION

Specific embodiments of the invention will now be described in detail with reference to the accompanying figures.

The following terms have these corresponding definitions in the description:

FINGERPRINT—a single file created by a software program that is a condensed representation of a file set of one or more files that uniquely identify those file(s) as discrete mathematical elements within the resulting fingerprint file. Furthermore, the fingerprint file is created without any modification to the file sets or files processed by the software program.

DNA ANALYSIS—a process executed by a computer program that determines whether a single fingerprint file contains any of the mathematical elements that are contained within a collection of other fingerprint files. The result of which is a report to illustrate which elements were detected and which were not.

In the following detailed description of embodiments of the invention, numerous specific details are set forth in order to provide a more thorough understanding of the invention. In other instances, well-known features have not been described in detail to avoid obscuring the invention.

Embodiments disclosed involve multiple technologies working in concert with each other to detect the presence of one set of files (a first set) within another set of files (a second set) without having access to either set of files. The invention resides in a software implemented product comprising a program that can be used to create a mathematical representation of a file set in a condensed format ("fingerprint") that uniquely identifies those files while making it impossible to reverse engineer their original content or determine the original names of the files in the file set that was fingerprinted. An embodiment comprises a public repository where such fingerprints (first set) can be managed, stored, and accessed by a plurality of computer systems. According to an embodiment, a computer system is configured by a software program which when executed by a single or plurality of processors comprised in the computer system, cause the system to analyze a second set of files or group of files, and with reference to the repository, determine if the file set contains or partially contains elements of a fingerprinted file set, i.e. fingerprinted file set from the first set.

According to an embodiment, the computer system is configured to generate and provide a report that that lists all the detected fingerprints (first set) that are contained in the analyzed group of files (second set). Such a report can provide diagnostics to the user to understand the makeup of the second set, such as:

a. Expected file was detected; b. Non-expected file was detected; c. Expected but modified file was detected; d. Different versions of an expected file were detected; and e. Expected file was not detected.

An additional embodiment includes a computer system configured to augment the analysis by including user created "private fingerprints" (say, a third set) that the user has created but not uploaded to the public repository. Additionally, the computer system is configured to augment the fingerprint format such that the fingerprint software and analysis programs can be periodically extended over time to improve the likelihood of detection of malicious tampering of files for the purpose of avoiding detection by the analysis program. Further, a modular structure to the fingerprinting program ensures that it can be augmented over time to process files in additional ways ("screens") that can detect modifications to files that may have been done maliciously in an attempt to avoid detection by the analysis software.

Embodiments disclosed include a computer automated system comprising a processing unit, a non-transitory storage medium coupled to the processing unit, wherein the non-transitory storage medium has stored thereon encoded instructions, which are implemented by the processing unit. The stored, implemented instructions configure the computer automated system to generate a mathematical representation of a first file or group of files in a condensed format that uniquely identifies the file or group of files while making it impossible to reverse engineer their original content. The generated mathematical representation is stored in the condensed format, in a repository. A second file or group of files is then analyzed, and a determination is made based on the analysis, and with reference to the repository, if the analyzed second file or groups of files contain an element or elements comprised in the first file or group of files. Accordingly the computer system is caused to generate a report comprising zero or more of the elements contained in the analyzed second file or group of files. According to an embodiment, the analysis is augmented by a user generated element or elements stored in another repository.

According to an embodiment, the repository is a public repository in communication with the computer system over a network. According to another embodiment the repository is a private repository, in communication with the computer system over a public or private network, or coupled directly to the computer system.

An embodiment includes, in a computer automated system comprising a processing unit, a non-transitory storage medium coupled to the processing unit, and having instructions encoded thereon, a method comprising: generating a mathematical representation of a first file or group of files in a condensed format that uniquely identifies the file or group of files while making it impossible to reverse engineer their original content. The method further includes storing the mathematical representation in the condensed format, in a repository. And subsequently analyzing a second file or group of files. The next step includes determining, based on the analyzing, and with reference to the repository, if the analyzed second file or group of files contains an element or elements comprised in the first file or group of files. Based on such determining, the computer implemented method triggers generating a report comprising zero or more of the elements contained in the analyzed second file or group of files. An embodiment of the method also includes, augmenting the analyzing by a user generated element or elements stored in another repository. According to an embodiment, the repository is a public repository in communication with the computer system over a network. According to another embodiment the repository is a private repository, in communication with the computer system over a public or private network, or coupled directly to the computer system.

Figure 1:
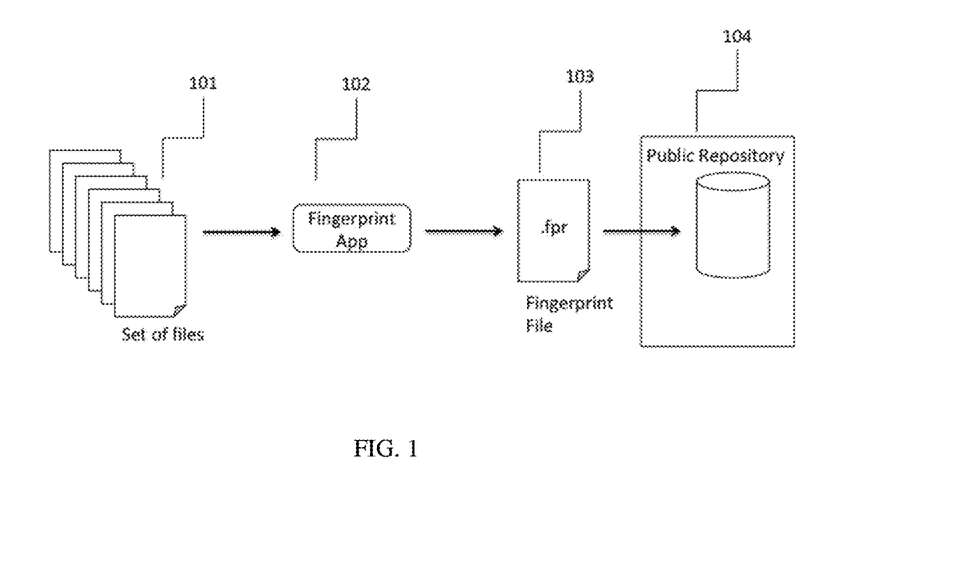
FIG. 1 illustrates a fingerprint creation flow diagram and storage in a repository.

FIG. 1 illustrates a fingerprint creation flow diagram. A fingerprint computer program (102) is used to produce a single fingerprint file (103) that represents a set of files (101). The fingerprint is then uploaded to a public (or private) repository (104). The flow entails creating a fingerprint for a reference set of files (step 1). The fingerprint is created by implementing a fingerprint creation computer program. The next step includes uploading reference fingerprints to a public or private repository (step 2). Step 3 includes creating a fingerprint for a target set of files using the fingerprint computer program. Then (step 4) an analysis tool is used for identifying any reference fingerprints contained in the target fingerprint. Generating a report based on the analysis is done in step 5.

Figure 2:
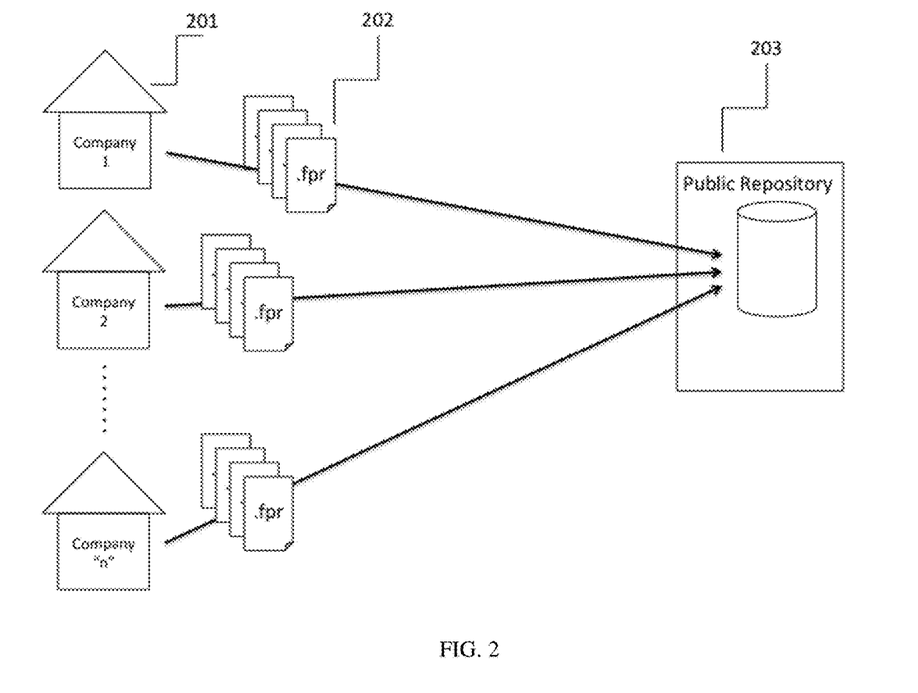
FIG. 2 illustrates the creation of a reference library of fingerprints from multiple sources and storage in a repository.

FIG. 2 illustrates the creation of a reference library of fingerprints. Owners of IP (201) can upload multiple fingerprints (202) to a public repository (203). Note that each fingerprint is a representation of a set of one or more files.

Figure 3:
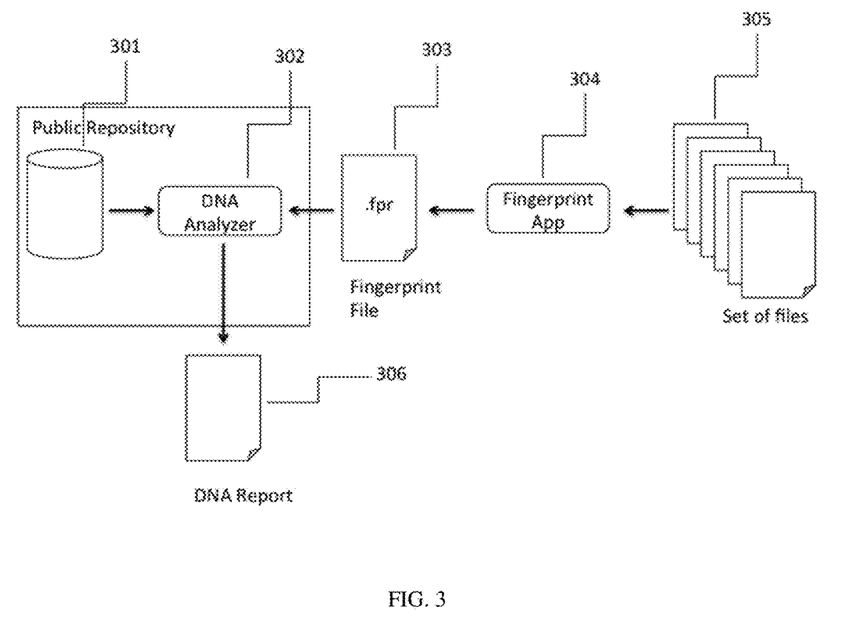
FIG. 3 illustrates the analysis of fingerprints on a repository located on a public server.

FIG. 3 illustrates the analysis of fingerprints on a public server. A user can fingerprint (304) their own set of files (305), then upload that fingerprint (303) to a server (301) for analysis (302) which generates a report (306) showing whether any of the files that they fingerprinted exist in the public repository.

Figure 4:
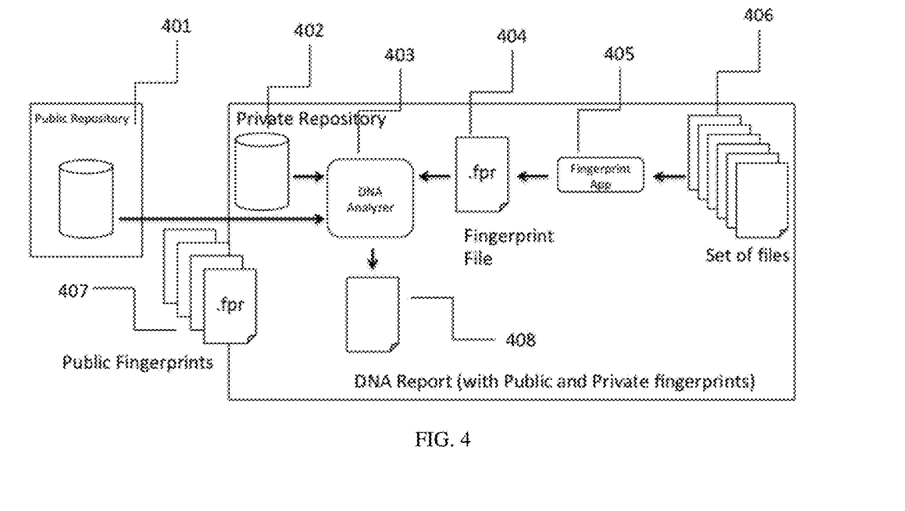
FIG. 4 illustrates the analysis of fingerprints in a repository on a private server augmented with fingerprints from another repository on a public server.

FIG. 4 illustrates the analysis of fingerprints on a private server. In this embodiment, a user uses the fingerprint program (405) to create a fingerprint (404) from a set of files (406) and performs an analysis (403) of that fingerprint against fingerprints (407) contained in the private repository (402). The analysis is augmented by including fingerprints from the public repository (401).

Figure 5A:
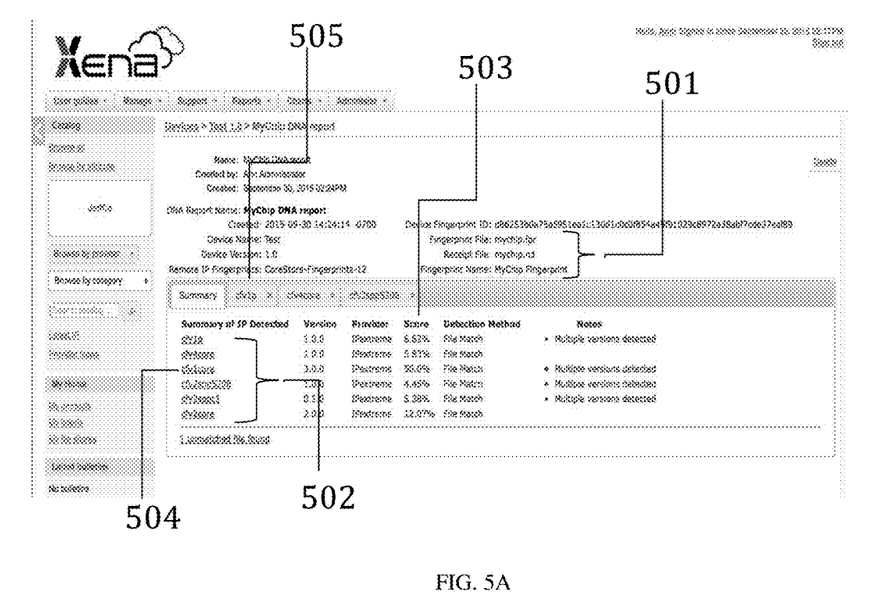
FIG. 5A is a screenshot that illustrates an example embodiment interface of a DNA summary report.

FIG. 5A illustrates an example embodiment interface of a DNA summary report. FIG. 5A shows a summary report. The group of files called "MyChip" was analyzed and a summary of which files detected and a score assigned. For example, the report tells us that MyChip contains 50% of the files contained in "cfv1core" version "3.0.0" from provider "IPextreme". Clicking on that hyperlink, brings up a tab with details as shown in FIG. 5B.

Figure 5B:
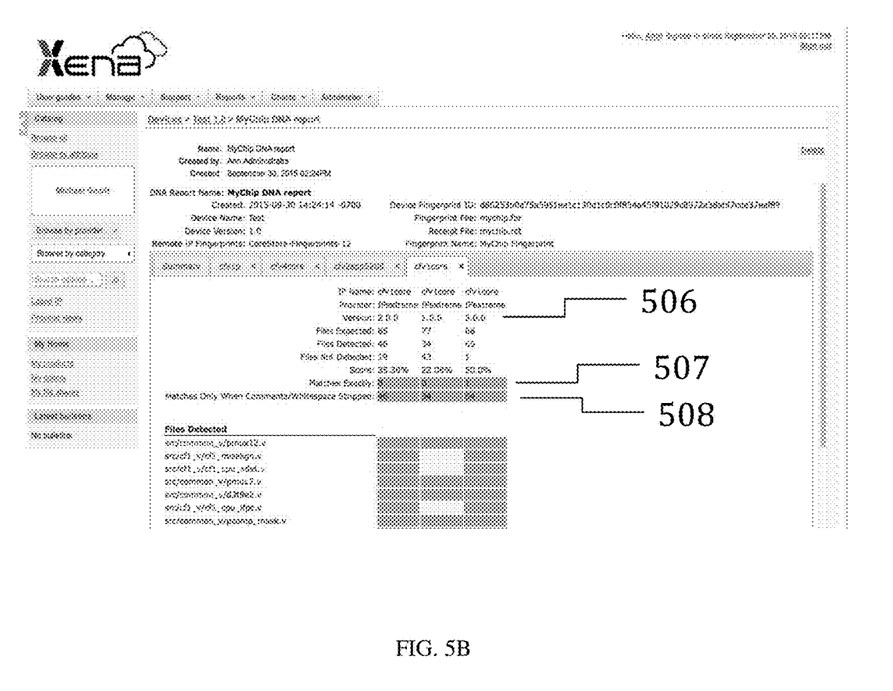
FIG. 5B is another screenshot that illustrates another example embodiment interface of a DNA detail report.

FIG. 5B illustrates further details of the embodiment interface of a DNA summary report. The report shows evidence that files from "cfv1core" were detected in the analysis of "MyChip". In addition, it shows that three possible versions (506) might be contained in MyChip. Version 3.0.0 had the highest probability of being the actual version contained in MyChip as indicated from the score of 50% versus other versions with lower scores. Version 3.0.0 shows that only 1 file (507) matched exactly, where the remaining files have been somehow modified (508), but still identifiable as being part of the cfv1core.Embodiments disclosed include a computer implemented method for fingerprinting IP. The method includes generating a first fingerprint for a first reference set of files. The method further includes uploading the generated first fingerprint to a repository. Subsequently, the method proceeds to generating a second fingerprint for a second target set of files; and analyzing the first and second fingerprint. The analyzing comprises comparing the first generated fingerprint to the second generated fingerprint, and based on the comparing, identifying zero or more reference fingerprints comprised in the second target fingerprint. Finally, a report is generated based on the identified fingerprints.

Embodiments disclosed include systems and methods for "Fingerprinting" IP. Embodiments disclose tools and methodologies that can scan IP and chip databases resulting in generation of a unique "fingerprint" for both IP and chips.

Embodiments disclosed include systems and methods for creating and accessing IP repositories for fingerprinted IP, i.e. a public place for a reference library of IP fingerprints from IP companies.

Embodiments disclosed include systems and methods for "DNA" Analysis of IP. Embodiments disclose tools and methodologies to analyze chip fingerprints comparing them to a reference library of IP fingerprints to produce a report on which IP is contained in the chip.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions. The present invention and some of its advantages have been described in detail for some embodiments. It should be understood that although embodiments disclosed include systems and methods for IP fingerprinting and IP DNA analysis, the system and method is highly reconfigurable, and embodiments include reconfigurable systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

We claim:

1. A method for automated design of a semiconductor device, the method comprising:
   first scanning, by a computer, a first set of files, the first set of files having first original file names, the first set of files containing a set of first elements comprising licensed original content engineering data necessary to manufacture a first semiconductor device including the licensed original content engineering data;
   first creating, by the computer from said first scanning, without modification of the first set of files, a first mathematical representation of the first set of files comprising a first condensed format in a first fingerprint file, the first condensed format is a first fingerprint that uniquely identifies the first set of files, the first condensed format in first fingerprint file configured to prevent determination of the first original file names from accessing the first fingerprint file, the first condensed format in the first fingerprint file configured to prevent reverse engineering of the licensed original content engineering data from accessing the first fingerprint file;
   storing, by the computer, the first condensed format in the first fingerprint file in a first repository of a private server;
   second scanning, by the computer, a second set of files, the second set of files having second file names, the second set of files containing a set of second elements comprising second content engineering data to manufacture a second semiconductor device including the second content engineering data;
   second creating, by the computer from said second scanning, without modification of the second set of files, a second mathematical representation of the second set of files comprising a second condensed format in a second fingerprint file, the second condensed format is a second fingerprint that uniquely identifies the second set of files;
   analyzing based on an analysis program, by the computer, the second fingerprint file with reference to the first fingerprint file to determine a presence in the second mathematical representation of any of the first elements of the first mathematical representation;
   augmenting, by the computer, the second fingerprint such that the analysis program can be periodically extended over time to improve likelihood of detection of malicious tampering of files for avoiding detection by other analysis program; and
   issuing, by the computer, from said analyzing, where any of the first elements of the first mathematical representation are determined to be present in the second mathematical representation, a report in relation to license authorization for using the second content engineering data to manufacture the second semiconductor device in relation to the licensed original content engineering data for manufacturing the first semiconductor device, wherein the report includes a summary of files detected and a score of a percentage of files that indicates match of files.

2. The method of claim 1, further comprising: the second condensed format in the second fingerprint file configured to prevent determination of the second file names from accessing the second condensed format in the second fingerprint file, the second condensed format in the second fingerprint file configured to prevent reverse engineering of the second content engineering data from accessing the second condensed format in the second fingerprint file.

3. The method of claim 1, further comprising: said analyzing, the second condensed format in the second fingerprint file with reference to the first condensed format in the first fingerprint file to determine the presence in the second mathematical representation of any of the first elements of the first mathematical representation, in relation to determining if the second set of files comprises any of the following: none of the set of first elements; the entire set of first elements; a subset of the set of first elements; a modification of the first set of files; and a version of the first set of files.

4. The method of claim 3, further comprising: reporting, from said analyzing, presence of following in the second set of files: the entire set of first elements; a subset of the set of first elements; a modification of the first set of files; and a version of the first set of files.

5. The method of claim 1, further comprising: augmenting, said analyzing by at least one user generated element stored in a second repository.

6. The method of claim 5, further comprising: said augmenting comprising communicating with the second repository, the second repository in communication with a computer system.

7. The method of claim 1, further comprising: configuring the first repository storing the first mathematical representation to store a plurality of mathematical representations from a plurality of computer systems in communication with the first repository.

8. A computer program product embodied in a non-transitory computer readable medium, which causes a processor to perform a method comprising:
   first scanning a first set of files, the first set of files having first original file names, the first set of files containing a set of first elements comprising licensed original content engineering data necessary to manufacture a first semiconductor device including the licensed original content engineering data;
   first creating from said first scanning, without modification of the first set of files, a first mathematical representation of the first set of files comprising a first condensed format in a first fingerprint file, the first condensed format is a first fingerprint that uniquely identifies the first set of files, the first condensed format in first fingerprint file configured to prevent determination of the first original file names from accessing the first fingerprint file, the first condensed format in the first fingerprint file configured to prevent reverse engineering of the licensed original content engineering data from accessing the first fingerprint file;
   storing the first condensed format in the first fingerprint file in a first repository of a private server;
   second scanning a second set of files, the second set of files having second file names, the second set of files containing a set of second elements comprising second content engineering data to manufacture a second semiconductor device including the second content engineering data;

second creating, by the computer from said second scanning, without modification of the second set of files, a second mathematical representation of the second set of files comprising a second condensed format in a second fingerprint file, the second condensed format is a second fingerprint that uniquely identifies the second set of files ;

analyzing based on an analysis program, by the computer, the second fingerprint file with reference to the first fingerprint file to determine a presence in the second mathematical representation of any of the first elements of the first mathematical representation;

augmenting the second fingerprint such that the analysis program can be periodically extended over time to improve likelihood of detection of malicious tampering of files for avoiding detection by other analysis program; and issuing from said analyzing, where any of the first elements of the first mathematical representation are determined to be present in the second mathematical representation, a report in relation to license authorization for using the second content engineering data to manufacture the second semiconductor device in relation to the licensed original content engineering data for manufacturing the first semiconductor device, wherein the report includes a summary of files detected and a score of a percentage of files that indicates match of files.

9. A computer system comprising:

a processor, and a non-transitory storage medium coupled to the processor, the non-transitory storage medium including instructions that when executed by the processor, cause performing a method comprising:

first scanning a first set of files, the first set of files having first original file names, the first set of files containing a set of first elements comprising licensed original content engineering data necessary to manufacture a first semiconductor device including the licensed original content engineering data;

first creating from said first scanning, without modification of the first set of files, a first mathematical representation of the first set of files comprising a first condensed format in a first fingerprint file, the first condensed format is a first fingerprint that uniquely identifies the first set of files, the first condensed format in first fingerprint file configured to prevent determination of the first original file names from accessing the first fingerprint file, the first condensed format in the first fingerprint file configured to prevent reverse engineering of the licensed original content engineering data from accessing the first fingerprint file;

storing the first condensed format in the first fingerprint file in a first repository of a private server;

second scanning a second set of files, the second set of files having second file names, the second set of files containing a set of second elements comprising second content engineering data to manufacture a second semiconductor device including the second content engineering data;

second creating, by the computer from said second scanning, without modification of the second set of files, a second mathematical representation of the second set of files comprising a second condensed format in a second fingerprint file, the second condensed format is a second fingerprint that uniquely identifies the second set of files ;

analyzing based on an analysis program, by the computer, the second fingerprint file with reference to the first fingerprint file to determine a presence in the second mathematical representation of any of the first elements of the first mathematical representation;

augmenting the second fingerprint such that the analysis program can be periodically extended over time to improve likelihood of detection of malicious tampering of files for avoiding detection by other analysis program; and issuing from said analyzing, where any of the first elements of the first mathematical representation are determined to be present in the second mathematical representation, a report in relation to license authorization for using the second content engineering data to manufacture the second semiconductor device in relation to the licensed original content engineering data for manufacturing the first semiconductor device, wherein the report includes a summary of files detected and a score of a percentage of files that indicates match of files.

* * * * *